July 19, 1927.
M. E. ROE
CASTER
Original Filed Dec. 16, 1921
1,636,326
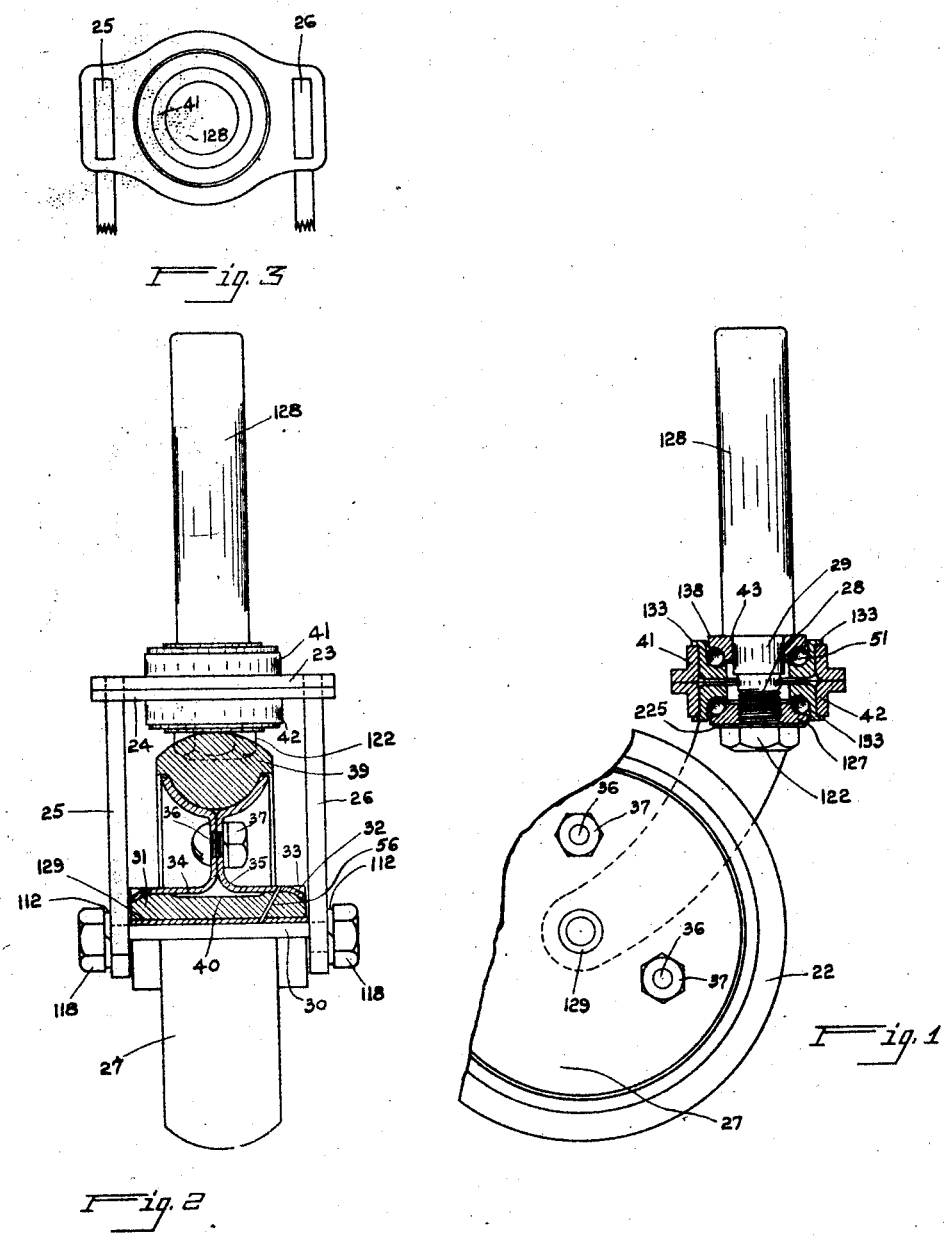
INVENTOR
Mayo. E. Roe
BY Frank M. Slough
his ATTORNEY.

Patented July 19, 1927.

1,636,326

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

CASTER.

Original application filed December 16, 1921, Serial No. 522,827. Divided and this application filed March 8, 1926. Serial No. 93,052.

My invention relates to casters of the type adaptable for use to support trucks, chairs, beds, portable tables, and the like.

An object of my invention is to provide an improved caster having a stem to secure the caster to the supported apparatus and which will permit swivelling of the caster fork independent of movement of the stem.

Another object of my invention is to provide a caster wherein undue wear of the parts is eliminated and which will be very durable.

Another object of my invention is to provide a caster comprising means for adjusting the bearings to accomplish the swivelling action with a minimum of friction and at the same time maintain the parts in proper alignment.

Another object of my invention is to provide a caster construction wherein the bearing will be placed relatively near the horizontal plane of the caster wheel axle so that lateral strains upon the bearings will be minimized.

A further object is to provide such a forked construction whereby the stem may be made of various diameters or lengths, the construction permitting of easy changing from one sized stem to another whenever this is desired.

Another object of my invention is to provide in a caster of the type above defined, a structure which may be assembled together from sheet metal stampings and in which the ball races will be capable of being assembled as a unit with the yoke of the caster fork and which will permit ready assembling with any desired type of caster stem.

Another object of my invention is to secure the aforesaid objects in a caster which is simple of construction, inexpensive to make and assemble and which will remain in efficient operating condition in use, at the same time providing for a minimum of friction between the wearing parts, and for ready access to the various operating parts as for repair or adjustment; the caster at the same time being capable of a wide and extensive use on various types of apparatus.

The aforesaid and other objects of my invention will be better understood by reference to the accompanying drawings, and description thereof which relate to a specific embodiment of this invention for the purpose of explaining the same and of which drawings:

Fig. 1 shows a side elevation of my improved caster, with a portion of the wheel cut away and the anti-friction means illustrated in section;

Fig. 2 shows an end elevation, with a portion of the wheel and its bearing in section; and Fig. 3 shows a top plan view of the upper portion of the caster fork.

Referring now to all of the figures in all of which like parts are indicated by like reference characters, at 128 is shown a fork stem which is reduced at 29 and again reduced at 28, the portions 29 and 28 being inserted into a ball bearing mechanism assembly of elements, the more reduced portion 28 being treated so as to provide a means of clamping the stem member 128 to the ball bearing mechanism, and which ball bearing mechanism carried the transverse fork supporting members 23 and 24 from which members depend the side prong members 25 and 26.

Carried between the prong members 25 and 26 is the caster wheel 27, said caster wheel being mounted on the axle 30 which passes through the prongs 25 and 26, and which is clamped thereto by clamping nuts 118. Lock washers 112 are placed between the under side of the clamping nuts and the outer sides of prongs 25 and 26. Placed immediately on the axle 30 is a tubular sleeve bushing 129, and cast iron hub 31 being carried on the sleeve bushing. The bushing, 129, takes the rotating wear of the load, and can be renewed and serves as a spacer to prevent side friction between hub 31 and fork sides 25 and 26. This bushing, 129, is preferably made of bearing metal such as brass or bronze. The cast iron hub 31 has end peripheral portions inclined inwardly as at 32, there being intermediate portions such as 33 however, which are less inclined or not inclined at all whereby an irregular periphery is provided at this point, these irregularities being provided for the purpose of preventing relative rotation of the cast iron hub 31 and the steel disc members 34 and 35 which are clamped together by a plurality of clamping bolts 36 and nuts 37.

A hole 56 in the hub 31 and the disc member 35 is provided to admit lubricating oil to the bearing 129.

The peripheral portions of the discs 34 and 35 flare outwardly and upwardly curvilinearly, the peripheral portions of the two discs being adapted to embrace the lower portions of a rubber tire 39 and form a seat therefor, the tire being removable whenever the two discs are disassociated by removing the nuts 37 and the bolts 36.

The cast iron hub 31 has an intermediate recessed portion, 40, thus providing a space between the portions of the disc members 34 and 35 next adjacent thereto so that a certain amount of flexibility may be had due to the inherent flexibility of the disc member portions.

The transverse fork supporting members 23 and 24 have centrally disposed openings, the members 23 and 24 being pressed upwardly and downwardly respectively, and as shown in Figs. 1 and 2, the transverse member 23 has a circular upstanding ring portion, 41, and the member 24 has a depending like ring portion, 42, these portions 41 and 42 providing a cylindrical opening within which the annular bearing members 133, and annular bearing cone members 127 and 138 are supported. The member 138 is seated on the shoulder 43 of the stem 128, and fits tightly onto the portion 29 thereof, and the cone member 127 is screw threaded on the threaded end 28 of the said stem. A clamping nut 122 is provided and adapted to be threaded on the outer end of the portion 28 of the stem in order to retain the cone member 127 in any desired set position.

The race members 133 have flanged peripheral portions adapted to fit over the outer edges of the members 41 and 42, and when the cone 127 and set nut 122 are in position, the entire bearing forms a connecting link between the stem 128 and the transverse fork prong supporting members 23 and 24 in such a way that the wheel 27 is rotatably carried between the fork prongs 25 and 26, and the wheel and fork prongs together with the transverse members 23 and 24 are adapted to rotate in a horizontal plane on the said bearings.

The embodiment of my caster as heretofore described can readily swivel in use, by virtue of the reduced parts 28 and 29 of the stem 128 being anti-frictionally mounted to rotate in the opposed ball bearing races heretofore described. The ball bearing races being supported in the transverse supporting members 23 and 24 midway thereof and the depending prongs 25 and 26 being curved outwardly, the axle 30 for supporting the wheel 27 is off set with respect to the axis of the stem 128 and likewise the center of the wheel 27 is off-set and accordingly will produce the desired swivelling of the caster.

It will be understood from the foregoing that the caster will accomplish the swiveling action with a minimum friction without permitting the parts to become out of proper alignment.

The caster may be employed, without departing from the invention, for either heavy or light duty on various types of, and kinds of furniture, by constructing the caster of materials of a strength proportionate to the use to which my caster is applied.

This application is divisional of my application, Serial No. 522,827, filed December 16, 1921.

Having thus described my invention in a specific embodiment, I am aware that numerous and extensive departures may be made from the embodiment herein illustrated and described but without departing from the spirit of my invention.

What I claim is:

1. In a ball bearing caster, the combination with a caster fork having a horizontally disposed centrally perforated sheet metal yoke, of a pair of oppositely disposed sheet metal centrally perforated bearing cups rigidly mounted on the yoke co-axially with the perforation thereof and rigidly carried thereby, a caster stem, a pair of spaced opposed bearing cones carried by and secured to the stem, a portion of each bearing cone telescoped within one of the cups, bearing balls interposed between the telescoped end of each cone and the inner surfaces of the end and side walls of the enclosing cup, and securing means disposed between the arms of the fork to secure the cones on the stem to provide an anti-frictional bearing for the caster on the stem, the caster stem projecting by a reduced portion entirely through the aligned perforations of the yoke and cups.

2. In a ball bearing swivel caster, the combination with a substantially U-shaped sheet metal caster fork having a centrally perforated horizontally disposed yoke having a pair of prong portions depending from opposite ends thereof, of a caster stem projected downwardly through said perforation, a pair of oppositely disposed bearing cones carried on the downwardly projecting end of the stem, one on each side of the yoke, bearing means comprising a pair of oppositely disposed centrally perforated bearing cups each having portions telescoped within the yoke perforation and having rim flanges projecting without the yoke perforation, one of said bearing cups having a bearing race surface on an upwardly disposed inner surface, the other cup having a bearing race surface on a downwardly disposed inner surface, said cones having opposed inner faces and bearing race surfaces formed thereon, two sets of bearing balls, one of said sets being disposed in the race formed by the opposed race surfaces of the upper cone and the upper cup, the other set disposed in the cup formed by the race surfaces of the lower cup, and axially adjustable securing means disposed on the end of the stem projected through the perforation disposed between the arms of the fork, adapted to continuously press the cups into proper adjusted relation to the yoke by their rim flange portions.

3. In a ball bearing caster, the combination with a caster fork comprising an intermediate perforated yoke and a caster securing element having a reduced end telescopable through the yoke perforation, of a pair of oppositely disposed bearing cups rigidly secured to the yoke and having openings therethrough co-axial with the yoke perforation, said bearing cups and yoke being formed entirely of sheet metal, a pair of cones having opposed bearing race surfaces carried by and secured to the caster securing element, one of each said cones having its bearing race surface disposed within a different one of the said cups, bearing balls interposed between the adjoining side and end wall inner surfaces of the cups and the cone race surfaces, and means disposed between the arms of the fork to secure one of the cones upon the reduced end of the caster securing element in adjusted relation to its cup race surface, comprising a securing nut screw-threaded on to the reduced end of the caster securing element, said securing having a shoulder engaging an outer surface of the other of the bearing cones.

In testimony whereof I hereunto affix my signature this 17th day of February, 1926.

MAYO E. ROE.

Certificate of Correction.

Patent No. 1,636,326.                              Granted July 19, 1927, to

MAYO E. ROE.

It is hereby certified that error appears in the printed specification of the above-numbered patent requiring correction as follows: Page 3, line 32, claim 3, after the word "securing", second occurrence, insert the word *element;* and that the said Letters Patent should be read with this correction therein that the same may conform to the record of the case in the Patent Office.

Signed and sealed this 16th day of August, A. D. 1927.

[SEAL.]                                                    M. J. MOORE,

*Acting Commissioner of Patents.*